Patented May 30, 1933

1,911,282

UNITED STATES PATENT OFFICE

HENRY H. MORETON, OF SANTA MONICA, CALIFORNIA, ASSIGNOR, BY MESNE ASSIGNMENTS, TO BILTMORE CONSERVATION CORPORATION, A CORPORATION OF NEVADA

METHOD OF PRODUCING A CATTLE FOOD

No Drawing. Application filed February 11, 1930, Serial No. 427,656. Renewed September 27, 1932.

This invention is a method of treating garbage so as to produce an edible food for cattle.

The object of the invention is to so treat garbage as to destroy objectionable bacteria and to sterilize and deodorize the mass so that it will produce a relatively high quality of cattle food.

In a co-pending application, Serial No. 421,203, is disclosed an apparatus for treating garbage so as to produce an edible food for cattle, poultry and hogs. In the apparatus disclosed in said application the garbage is first cooked, and then subjected to a process by which the bones, metal and other non-edible substances are removed therefrom, after which the material is treated to express the oils and fats, leaving a substantially dry residue.

In another co-pending application of Serial No. 427,558 is disclosed an apparatus by which the cooking step of the treatment of garbage for the purposes of the present invention is carried out. No claim is made herein for the process disclosed in the said last mentioned application, but as therein pointed out the garbage is first placed in a closed chamber which is enclosed by a steam jacket. Steam is then introduced into the jacket from any suitable source, and the interior of the closed chamber is subjected to vacuum in any desired manner. It is preferred that the steam pressure within the jacket should be approximately 100 lbs. per square inch. In a short time, the heat generated by the steam jacket, assisted by agitation of the contents of the closed chamber, will heat said contents to such an extent that the moisture contained in the garbage tends to expand and sets up an internal pressure within said chamber. This heating or cooking step is continued until the internal pressure is brought up to approximately 40 lbs. per square inch. The jacket pressure is maintained at approximately 100 lbs. per square inch and the internal pressure is maintained at approximately 40 lbs. per square inch for a period of approximately forty-five minutes. At the end of this cooking stage, agitation of the material is stopped, and the internal pressure also removed by shutting off the steam to the steam jacket. The material, which is of a thick soupy consistency is then subjected to vacuum for a short period of time, for instance approximately 30 minutes, the effect of which is such that the melted oils and fats are raised or drawn to the surface of the mass, so that they may be easily drawn off. At the conclusion of the last mentioned vacuum treatment, the solid garbage content of the chamber is thoroughly dried, after which the non-edible constituents, and any remaining oils or fats are removed in any suitable manner, for instance by the apparatus disclosed in my said copending application, Serial No. 421,203.

In carrying out the present invention, after the garbage has been subjected to the heat and internal pressure for a short time, a mixture of carbonate of soda dissolved in water is added to the garbage and the whole is agitated. In practice, it is preferred to add to a batch of approximately 3 tons of garbage a mixture of approximately 5 pounds of carbonate of soda dissolved in approximately 5 gallons of water, the agitation being carried on for a period of approximately 10 minutes at a temperature of from approximately 100° F. to aproximately 150° F.

The foregoing treatment is followed by the addition of a mixture of alum and chloride of lime dissolved in water. The preferred proportions are approximately 10 pounds of alum and from 3 to 5 pounds of chloride of lime dissolved into 15 gallons of water.

After adding the alum and chloride of lime mixture the agitation and internal pressure are continued as described in the application for patent Serial No. 427,558, above identified and is followed by subjecting the material to a vacuum for approximately six hours. The effect of the vacuum treatment is to first draw the oils, fats and other liquids to the surface of the mass from which they are drawn in any suitable manner. At the end of the six hour period of vacuum treatment the solid garbage will be thoroughly dried so that any remaining oils, fats and non-edible constituents may be removed in the manner above described.

The advantage of the above method will be readily apparent to those skilled in the art to which it belongs. It will be particularly noted that the treatment described results in a sweetening of the fat and other animal constituents, that is, objectionable bacteria are destroyed and the mass is sterilized and deodorized so that it will produce a relatively high quality of cattle food.

Having thus explained the nature of the invention and described an operative manner of constructing and using the same, although without attempting to set forth all of the forms in which it may be made, or all of the forms of its use, what is claimed is:—

1. The method of producing an edible food from garbage comprising placing raw garbage within a closed chamber, causing the moisture in the garbage to create an internal pressure within the chamber by the application of external heat, sterilizing and deodorizing the mass by adding a mixture of carbonate of soda and water, and later adding a mixture of alum and chloride of lime in water, subjecting the mass to external heat and internal agitation after each mixture is added, drawing the liquids to the surface of the mass by subjecting the mass to vacuum within said closed chamber, withdrawing said liquids and continuing the vacuum treatment until the residue is dry.

2. The method of producing an edible food from garbage comprising placing garbage within a closed chamber, causing the moisture in the garbage to create an internal pressure within the chamber by the application of external heat, and maintaining said pressure for a predetermined period, sterilizing and deodorizing the mass by adding thereto a mixture of carbonate of soda dissolved in water in the proportions of approximately five pounds of carbonate of soda dissolved in five gallons of water to three tons of garbage and later adding a mixture of alum and chloride of lime in water, subjecting the mass to external heat and internal agitation after each mixture is added, drawing the liquids to the surface of the mass by subjecting said mass to vacuum within said closed chamber, withdrawing said liquids and continuing the vacuum treatment until the residue is dry.

3. The method of producing an edible food from garbage comprising placing raw garbage within a closed chamber, causing the moisture in the garbage to create an internal pressure within the chamber by the application of external heat, sterilizing and deodorizing the mass by adding a mixture of carbonate of soda and water and later adding a mixture of approximately ten pounds of alum and not exceeding five pounds of chloride of lime dissolved in fifteen gallons of water for each three tons of garbage, subjecting the mass to external heat and internal agitation after each mixture is added, drawing the liquids to the surface of the mass by subjecting said mass to vacuum within said closed chamber, drawing off said liquids and continuing the vacuum treatment until the residue is dry.

4. The method of producing an edible food from garbage comprising placing raw garbage within a closed chamber, causing the moisture in the garbage to create an internal pressure within the chamber by the application of external heat, sterilizing and deodorizing the mass by adding a mixture of five pounds of carbonate of soda dissolved in five gallons of water to a batch of three tons of garbage and later adding to said batch a mixture of approximately ten pounds of alum and not less than three pounds of chloride of lime dissolved in fifteen gallons of water, subjecting the mass to external heat and internal agitation after each mixture is added, drawing the liquids to the surface of the mass by subjecting the batch to vacuum within said closed chamber, draining off the liquids and continuing the vacuum treatment until the residue is dry.

5. The method of producing a food material from garbage comprising placing the garbage in a closed chamber, adding to the batch a mixture of carbonate of soda dissolved in water, causing the moisture in the mass to create an internal pressure within the chamber by the application of external heat to a temperature not exceeding 150° F. and agitating the mass for approximately ten minutes, then adding a mixture of alum and chloride of lime dissolved in water and continuing the agitation, drawing the liquids to the surface of the mass by subjecting said mass to vacuum within said closed chamber, and draining off said liquids and continuing the vacuum treatment until the mass is dry.

In testimony whereof I have hereunto set my hand.

HENRY H. MORETON.